(No Model.)

W. C. HOMAN.
TOOL HOLDER FOR LATHES.

No. 484,317. Patented Oct. 11, 1892.

Witnesses:
J. H. Shumway
Lillian D. Keeley

William C. Homan
Inventor
By attys
Earle & Seymour

THE NORRIS PETERS CO., PHOTO-LITHO., WASHINGTON, D. C.

UNITED STATES PATENT OFFICE.

WILLIAM C. HOMAN, OF MERIDEN, ASSIGNOR TO THE HENDEY MACHINE COMPANY, OF TORRINGTON, CONNECTICUT.

TOOL-HOLDER FOR LATHES.

SPECIFICATION forming part of Letters Patent No. 484,317, dated October 11, 1892.

Application filed April 4, 1892. Serial No. 427,670. (No model.)

*To all whom it may concern:*

Be it known that I, WILLIAM C. HOMAN, of Meriden, in the county of New Haven and State of Connecticut, have invented a new Improvement in Tool-Holders for Engine-Lathes; and I do hereby declare the following, when taken in connection with accompanying drawings and the letters of reference marked thereon, to be a full, clear, and exact description of the same, and which said drawings constitute part of this specification, and represent, in—

Figure 1:
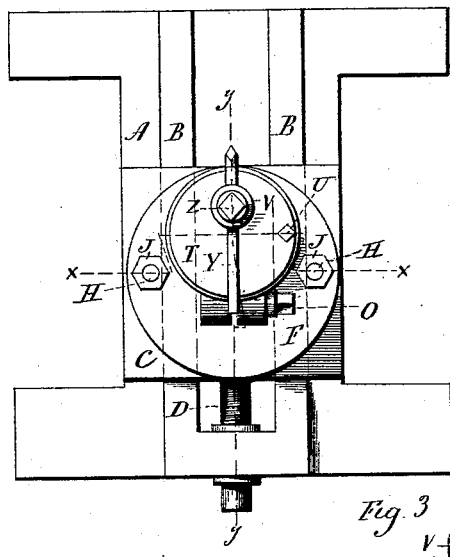
Figure 2:
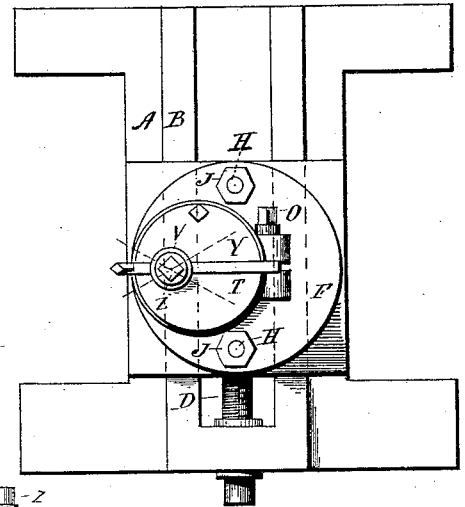
Figure 4:
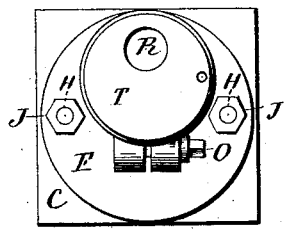
Figure 3:
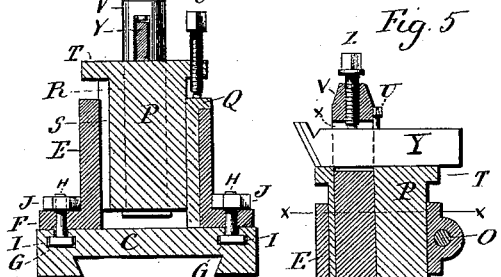
Figure 5:
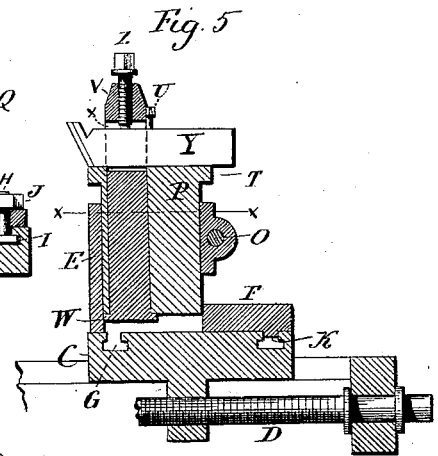
Figure 6:
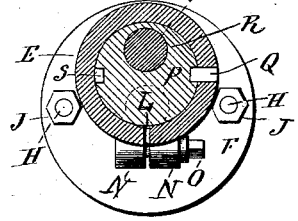
Figure 7:
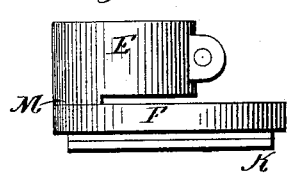
Figure 8:
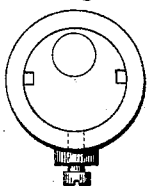

Figure 1, a plan view of the longitudinal carriage of an engine lathe, showing a top view of the improved tool-post arranged thereon with the tool in position for longitudinal cutting; Fig. 2, the same as in Fig. 1, with the tool-post adjusted for transverse cutting; Fig. 3, a vertical central section cutting on line *x x* of Fig. 1; Fig. 4, a top view of the socket and turn-table, the tool-post removed; Fig. 5, a transverse section cutting on line *y y* of Fig. 1; Fig. 6, a transverse section cutting on line *x x* of Fig. 5; Fig. 7, a side view of the turn-table and socket detached; Fig. 8, a modification in the construction of the socket.

This invention relates to an improvement in the device for carrying the cutting-tool in engine-lathes, commonly called the "tool-post," the invention having for its object to give a support for the tool at a point as near the cutting-edge as possible, and also the ready adjustment of the tool, both as to angular and vertical position, and also to permit the removal of the tool from the lathe while at work and replace it with certainty that the tool will stand in the same position when so replaced as it did when removed; and the invention consists in the construction as hereinafter described, and particularly recited in the claims.

A represents the longitudinally-sliding carriage, adapted to move on the shears of the lathe in the usual manner. The carriage is constructed with transverse guides B, on which the transversely-movable carriage C is arranged in the usual manner and moved transversely by means of a leading-screw D in the usual manner. On the transverse carriage C the tool-post socket E is arranged. This socket is in the form of a vertical tube projecting upward from a turn-table F, to which the socket is attached or made as an integral part thereof. The carriage C is constructed with a circular undercut groove G, concentric with the turn-table F, and through the turn-table bolts H H are arranged, the heads I of the bolts standing in the concentric groove G in the carriage, the bolts extending up through the turn-table and provided with nuts J, so that the nuts being turned hard down upon the turn-table F will secure the turn-table firmly to the carriage, so that it will partake of the movement of that carriage, whether it be transversely across the principal carriage A or longitudinal with that principal carriage. The turn-table is preferably constructed on the under side with a circular rib K, (see Fig. 5, and as indicated in broken lines, Figs. 4 and 6,) which sets into the open circular groove in the carriage C, as seen in Fig. 5, which serves to support the turn-table on the carriage C against radial movement, and independent of the bolts by which the turn-table is secured to the carriage. By loosening the nuts J the turn-table is rotatable in a horizontal plane on the carriage C and set at any desired position. The tubular socket E is arranged eccentric to the turn-table F, as seen in Fig. 6.

The tubular socket E is divided vertically, as at L, and the socket is separated from the turn-table from the divided side rearward, leaving a connection between the socket and the turn-table at the rear side M, Fig. 7. The larger portion of the socket from the slit being thus free, the socket is adapted to expand or contract to a limited extent. At the joint the socket is constructed with ears N N upon opposite sides, and through these ears a screw O is introduced, threaded into one of the ears, and so that by means of the screw the two edges of the socket at the division may be drawn together, so as to contract the diameter of the socket to some extent, or by withdrawing the screw to permit the expansion of the socket.

P represents the tool-post, which is of cylindrical shape and corresponds in diameter, substantially, to the internal diameter of the socket E and so that it may be set therein and free to be moved up or down, and when the post P is set into the socket the post may be clamped by means of the clamping-screw O, so as to be firmly held in the socket. The post may be adjusted up or down in the socket to any desired elevation within the range of its length, and when so adjusted the clamping-screw is applied to firmly secure the post in that position. To prevent the rotation of the tool-post in its socket, a feather or spline Q is arranged vertically in the socket and the post is correspondingly grooved, so that while the post may be moved up or down its rotation independent of the socket is prevented.

Vertically through the post is an opening R, but eccentric to the post. The eccentricity of the opening R to the post is equal to the eccentricity of the post to the turn-table and so that when the post is set into the socket with the shorter radius of the eccentric opening R in line with the shorter radius of the eccentric socket, as seen in Fig. 6, the opening R in the post is near one side of the socket. Now if the post be withdrawn from the socket and turned one-half around and set again into the socket, as indicated in broken lines, Fig. 6, the opening R will be brought into position concentric with the turn-table F, and that such adjustment of the post may be made, the post is constructed with two grooves corresponding to the spline, the said two grooves being diametrically opposite each other and at right angles to a diametrical line centrally through the post and through the opening R, as seen in Fig. 6, S representing the second groove opposite the spline Q. The post P is constructed with an annular projecting flange T at its upper end of substantially the same diameter as the upper end of the socket, and through this flange is a vertical adjusting-screw U, which is adapted to bear upon the upper end of the socket or, as here represented, upon the upper end of the spline and so that by turning the screw the post may be adjusted up or down, as occasion requires, it being understood that usually the clamp of the socket upon the post will be relieved for such vertical adjustment.

Through the vertical opening R of the post the tool-clamp spindle V is arranged. This spindle is of cylindrical shape and is introduced through the opening R from the lower end of the post, and the lower end of the spindle V is constructed with a head W to take a bearing against the lower end of the post. Through a spindle V a diametrical opening X is formed, through which the tool Y may pass, as usual in tool-holders, and the spindle is provided through its upper end with a screw Z, by which the tool may be clasped. For longitudinal cutting the post and turn-table stand in the position as seen in Fig. 1. The tool is introduced through the spindle and clamped upon the post, as seen in Figs. 1 and 5, and so as to stand in a right-angular position across the lathe. The socket being eccentric to the turn-table brings the inner side of the post close up to the work and so that the inner end of the tool may rest directly upon the post, and thereby give so firm a support to the tool that it cannot by any possibility yield under the force produced in cutting. The rigid support of the tool when near its cutting-point insures more perfect work from the tool than can be produced where the usual projection of the tool beyond the post is necessary. If the cut is to be a transverse one, the turn-table is turned one-fourth around to the position seen in Fig. 2, and this turning is accomplished without change of adjustment of the tool with relation to its post. It frequently occurs that it is desirable to remove the tool from the lathe and insure its return in precisely the position which it occupied before removal. For such removal and replacing of the tool the clamp of the socket upon the tool-post is relieved and so that the post, with the tool and its clamping-spindle, may be withdrawn without possible change of the tool with relation to the post, and then the post, reset into the socket, finds its location, because of the spline, and the tool thus returned must unavoidably find the identical position which it occupied before its removal. If at any time it is desirable to bring the tool-holder concentric with the turn-table, the post is withdrawn from the socket and turned one-half around, as represented in broken lines, Fig. 6, which brings the tool-holder into a position concentric with the turn-table. To adjust the tool to different angles with relation to the post, the tool-holding spindle may be turned to the right or left without movement of the post or turn-table and, as indicated in broken lines, Fig. 2, so that the post permits the adjustment of the tool to any desired position. In setting the tool the vertical adjusting-screw U will be employed to give it the required elevation.

While I prefer to construct the tool-post socket as a clamp, so that the post may be securely held within the socket, the socket may be made solid, as seen in Fig. 8, and a set-screw introduced through one side to bear upon the tool-post, so as to secure it in its position when adjusted.

While I prefer to provide the socket and the post with a vertical spline to prevent rotation of the post in the socket, this is not essential to the invention, as the spline may be omitted and dependence had upon the clamping effect between the post and socket to hold the post in place.

I claim—

1. In an engine-lathe, the combination of the transverse movable carriage with a turn-table arranged thereon and adapted for circular adjustment, a vertical tubular socket on said turn-table, but eccentric to the axis upon which the turn-table rotates, a tool-post adjustable in said socket, the tool-post constructed with a vertical opening eccentric to the axis of said socket and post, with a tool-clamping spindle through said opening in the post, and means, substantially such as described, for securing the post in the socket, substantially as and for the purpose described.

2. In combination with the transversely-movable carriage of an engine-lathe, a turn-table arranged upon said carriage and adjustable in a circular path, a vertical tubular socket arranged upon said turn-table, but eccentric to the axis upon which the turn-table rotates, the socket divided and provided with means for drawing the divided edges of the socket toward each other, a cylindrical tool-post arranged in said socket and vertically adjustable therein, a vertical opening through the post, but eccentric to the axis of the post, and a tool-clamping spindle through said opening in the post, substantially as and for the purpose described.

3. The combination of the transversely-movable carriage of an engine-lathe with a turn-table arranged upon said carriage and so as to be rotatably adjustable in a horizontal plane, a vertical tubular socket on said turn-table, the axis of the socket being eccentric to the axis on which the turn-table rotates, a cylindrical post arranged in the said socket, a spline and groove between said post and socket, whereby the said post is movable vertically, but prevented from rotation in the socket, the post constructed with a vertical opening through it, and means, substantially such as described, for clamping the post in the socket, substantially as and for the purpose described.

In testimony whereof I have signed this specification in the presence of two subscribing witnesses.

WILLIAM C. HOMAN.

Witnesses:
CHAS. E. HOMAN,
ALFRED DUNLOP.